United States Patent
Schiele et al.

(10) Patent No.: US 9,388,899 B2
(45) Date of Patent: Jul. 12, 2016

(54) METHOD AND CONTROL DEVICE THERETO FOR OPERATING AN AUTOMATIC TRANSMISSION

(71) Applicant: ZF Friedrichshafen AG, Friedrichshafen (DE)

(72) Inventors: Peter Schiele, Kressbronn (DE); Bernd Allgaier, Kressbronn (DE); Peter Spoerl, Ravensburg (DE); Franz-Josef Schuler, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/613,786

(22) Filed: Feb. 4, 2015

(65) Prior Publication Data
US 2015/0219211 A1    Aug. 6, 2015

(30) Foreign Application Priority Data
Feb. 4, 2014   (DE) .......... 10 2014 201 974

(51) Int. Cl.
| | |
|---|---|
| G06F 17/00 | (2006.01) |
| F16H 63/30 | (2006.01) |
| F16D 48/06 | (2006.01) |
| F16H 63/34 | (2006.01) |

(52) U.S. Cl.
CPC ............ *F16H 63/3026* (2013.01); *F16D 48/06* (2013.01); *F16D 2500/1085* (2013.01); *F16D 2500/308* (2013.01); *F16D 2500/3063* (2013.01); *F16D 2500/3065* (2013.01); *F16D 2500/30803* (2013.01); *F16D 2500/3101* (2013.01); *F16D 2500/3108* (2013.01); *F16D 2500/3109* (2013.01); *F16D 2500/3117* (2013.01); *F16D 2500/3148* (2013.01); *F16D 2500/5043* (2013.01); *F16D 2500/50676* (2013.01); *F16D 2500/7105* (2013.01); *F16H 63/34* (2013.01)

(58) Field of Classification Search
None
See application file for complete search history.

(56) References Cited

U.S. PATENT DOCUMENTS

| | | | |
|---|---|---|---|
| 6,067,871 | A | 5/2000 | Markyvech et al. |
| 7,104,922 | B2 | 9/2006 | Dreibholz et al. |
| 7,108,115 | B2 | 9/2006 | Ebenhoch et al. |

(Continued)

FOREIGN PATENT DOCUMENTS

| | | |
|---|---|---|
| DE | 291 380 A5 | 6/1991 |
| DE | 197 35 844 A1 | 2/1999 |

(Continued)

OTHER PUBLICATIONS

German Patent Office Search Report, Sep. 1, 2014.

*Primary Examiner* — Dirk Wright
(74) *Attorney, Agent, or Firm* — Dority & Manning, P.A.

(57) ABSTRACT

A method for operating an automatic transmission of a motor vehicle, whereas the automatic transmission features several interlockable shifting elements, involves determining, from the data made available from the driving operation of the motor vehicle, a change to consumption of the motor vehicle expected to be caused by an activated interlocking of the shifting elements and a change to the shifting dynamics of the motor vehicle expected to be caused by an activated interlocking of the shifting elements. The changes are evaluated such that, depending on the change to consumption and depending on the change to shifting dynamics, an interlocking of the shifting elements is permitted or not permitted.

12 Claims, 1 Drawing Sheet

(56) References Cited

U.S. PATENT DOCUMENTS

| | | | | |
|---|---|---|---|---|
| 7,222,011 | B2 * | 5/2007 | Smith | B60W 10/02 192/3.51 |
| 8,398,522 | B2 | 3/2013 | Bauknecht et al. | |
| 8,663,055 | B2 | 3/2014 | Brehmer et al. | |
| 2008/0293543 | A1 | 11/2008 | Bek | |
| 2015/0088349 | A1 * | 3/2015 | Akashi | B60W 10/08 701/22 |

FOREIGN PATENT DOCUMENTS

| | | |
|---|---|---|
| DE | 10 2008 042 957 A1 | 4/2010 |
| DE | 10 2012 013 695 A1 | 1/2014 |

* cited by examiner

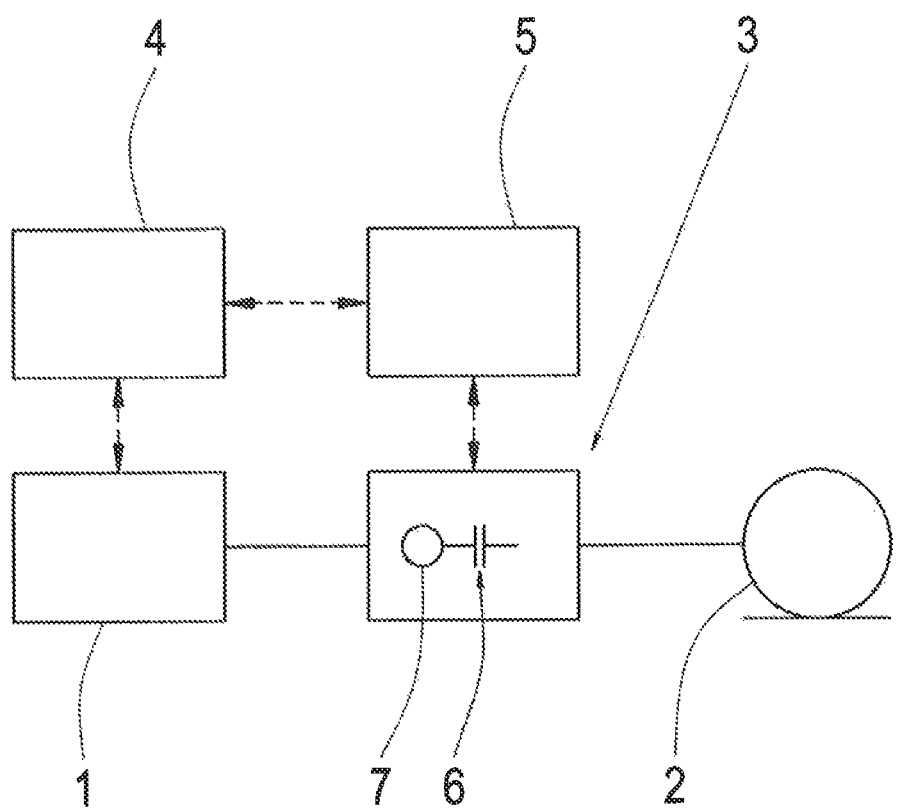

METHOD AND CONTROL DEVICE THERETO FOR OPERATING AN AUTOMATIC TRANSMISSION

FIELD OF THE INVENTION

The invention relates to a method for operating an automatic transmission and a control device for implementing the method.

BACKGROUND

Automatic transmissions for motor vehicles that are known in practice possess multiple shifting elements, whereas, in each gear of the automatic transmission, a first number of shifting elements is closed or switched on, and a second number of shifting elements is opened or switched off. For opening and closing, the shifting elements of the automatic transmissions known in practice are hydraulically actuatable, i.e. typically in such a manner that if, at a particular shifting element, no hydraulic pressure or hydraulic pressure that is too low is applied, the particular shifting element is opened, whereas if, at the shifting element, a sufficiently high hydraulic pressure is applied, the particular shifting element is closed.

Automatic transmissions with such hydraulically actuatable shifting elements are known, for example, from DE 10 2007 055 808 A1 and DE 10 2008 000 429 A1.

Interlocking hydraulically actuatable shifting elements of an automatic transmission in a closed state by means of a locking device or an interlocking device is also known from, for example, DE 102 44 523 A1, such that the respective shifting element also remains closed if the hydraulic operating pressure is released.

A hydraulically actuatable shifting element of an automatic transmission with a mechanical locking device or interlocking device is known from DE 103 04 050 A1.

A hydraulically actuatable shifting element of an automatic transmission with an electromotive or electromagnetically actuatable blocking device or interlocking device is known from EP 1 995 484 B1.

As stated above, if a hydraulically actuated shifting element is interlocked in a closed state by means of an interlocking device or a blocking device or a locking device, the particular shifting element is held in a closed state if the hydraulic operating pressure that is actually required for closing the particular shifting element is released. This has the advantage that the receiving torque of an oil pump, which is used to provide hydraulic operating pressure, can be reduced, such that the consumption of the motor vehicle may ultimately be reduced.

If a shifting element of an automatic transmission is interlocked, the interlocking must be lifted for the opening of the same; this is why it is necessary to open the respective interlocking device. Thereby, upon the opening of a previously interlocked shifting element, delay times may develop; these may affect the shifting dynamics of the automatic transmission.

There is a need for a method for operating an automatic transmission of a motor vehicle, with the assistance of which the interlocking for interlockable shifting elements of the automatic transmission may be selectively permitted or not permitted, and thus selectively activated or deactivated.

SUMMARY OF THE INVENTION

On this basis, the present invention is subject to a task of creating a new method for operating an automatic transmission, and a control device for implementing the method. Additional objects and advantages of the invention will be set forth in part in the following description, or may be obvious from the description, or may be learned through practice of the invention.

This task is solved by a method for operating an automatic transmission as described herein.

In accordance with the invention, from the data made available from the driving operation of the motor vehicle, a change to consumption of the motor vehicle expected to be caused by an activated interlocking of shifting elements and a change to the shifting dynamics of the motor vehicle expected to be caused by an activated interlocking of shifting elements are evaluated such that, depending on the change to consumption and depending on the change to shifting dynamics, an interlocking of shifting elements is permitted or not permitted.

With the method in accordance with the invention, the change to consumption of the motor vehicle expected to be caused by an activated interlocking of shifting elements and the change to the shifting dynamics of the motor vehicle expected to be caused by an activated interlocking of shifting elements are evaluated such that, depending on the change to consumption and the change to the shifting dynamics, an interlocking of shifting elements is permitted or not permitted, or an interlocking of shifting elements is activated or deactivated. Thereby, it is particularly advantageously possible that the interlocking of shifting elements is to be selectively permitted or not permitted, or activated or deactivated, in order to provide higher shifting dynamics when there is higher consumption, or lower shifting dynamics when there is lower consumption.

According to an advantageous additional form, an interlocking of the shifting elements is permitted or activated if the motor vehicle is not operated in coasting mode, and/or if the motor vehicle is not braked, and/or if the motor vehicle is operated at constant driving speed, and/or if the transmission temperature is neither too high nor too low, and/or if the driving or shifting program permits the activation of the interlocking, and/or if a sufficiently long time is available before the next request for a gearshift, and/or if the energy balance upon an activated interlocking is positive, and/or if there is a low amount of driver-side driving activity, and/or if a spontaneous driver-side performance request is unlikely. If none of these conditions is fulfilled, the interlocking of the shifting elements is not permitted or is deactivated, and is thus terminated. The number and type of the above conditions, which are used in the implementation of the method in accordance with the invention, depends on the specific configuration of the motor vehicle. The above conditions may be used together in any combination.

According to an additional advantageous additional form, if the interlocking of the shifting elements is not permitted, or has been deactivated and/or terminated, a subsequent activation is permitted once again only after the expiration of a defined time frame. Such a debouncing prevents required shifting dynamics from being impermissibly reduced through the activation of an interlocking of the shifting elements.

The control device in accordance with the invention is defined below.

BRIEF DESCRIPTION OF THE DRAWING

Preferred additional forms arise from the sub-claims and the following description. Embodiments of the invention are, without any limitation, more specifically described by means of the drawing. Thereby, the following is shown:

FIG. 1 a drive train diagram of a motor vehicle;

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

The present invention relates to a method for operating an automatic transmission of a motor vehicle.

FIG. 1 shows a highly schematized drive train diagram of a motor vehicle, whereas, in accordance with FIG. 1, an automatic transmission 3 is shifted between a drive unit 1 and an output 2, which converts rotational speeds and torques, and thus provides the supply of pulling force of the drive unit 1 at the output 2. The operation of the drive unit 1 is controlled and/or governed by a motor control device 4 and the operation of the automatic transmission 3 is controlled and/or governed by a transmission control device 5, by which, in accordance with FIG. 1, the motor control device 4 exchanges data with the drive unit 1, and the transmission control device 5 exchanges data with the automatic transmission 3, in the sense of the double arrows that are shown. Likewise, the motor control device 4 and the transmission control device 5 exchange information between each other. The automatic transmission 3 includes several shifting elements 6, whereas only such a shifting element 6 is shown by example in FIG. 1. An interlocking device 7, by which the shifting element 6 may be interlocked in a closed state, is allocated to the shifting element 6 shown in FIG. 1, where such an interlocking device 7 may comprise, for example, a mechanical interlocking device or a hydraulic interlocking device or an electromotive interlocking device or also an electromagnetic interlocking device.

The invention relates to a method for operating such the automatic transmission 3 with interlockable shifting elements 6, with the assistance of which an interlocking of the shifting elements 6 is selectively permitted or not permitted, or an interlocking of the shifting elements 6 is selectively activated or deactivated.

From the data made available from the driving operation of the motor vehicle, a change to consumption of the motor vehicle expected to be caused by an activated interlocking of the shifting elements 6 and a change to the shifting dynamics of the motor vehicle expected to be caused by an activated interlocking of the shifting elements 6 are evaluated such that, depending on the change to consumption and depending on the change to shifting dynamics, an interlocking of the shifting elements 6 of the automatic transmission 3 is permitted or not permitted, or an interlocking of the shifting elements is activated or deactivated. Accordingly, in accordance with the invention, there is a balancing on the control side between the interests of consumption on the part of the motor vehicle that is as low as possible, and shifting dynamics of the same that are as high as possible, in order to, depending on this, selectively permit or not permit the interlocking of the shifting elements 6 of the transmission 3.

According to an advantageous embodiment, an interlocking of the shifting elements 6 of the automatic transmission 3 is only permitted or activated if the motor vehicle is not operated in coasting mode and/or if the motor vehicle is not braked and/or if the motor vehicle is operated at constant driving speed and/or if the transmission oil temperature is neither too high, nor too low and/or if the driving or shifting program permits the activation of the interlocking and/or if a sufficiently long time is available by the next request for a gearshift and/or if the energy balance upon an activated interlocking is positive and/or if there is a low amount of driver-side driving activity and/or if a spontaneous driver-side performance request is unlikely.

Preferably, the new conditions above, depending on which the interlocking of the shifting elements 6 of the automatic transmission 3 is permitted or not permitted, are assessed in combination with each other. However, depending on the specific configuration of the motor vehicle, only some of such new conditions may be evaluated or assessed in combination with each other.

If an interlocking of the shifting elements is permitted or activated, some or more of the above conditions may, upon the non-fulfillment of the same, also lead to the deactivation or termination of an activated interlocking.

According to a first of the above conditions, the interlocking of the shifting elements of the automatic transmission is only permitted or activated if the motor vehicle is not operated in coasting mode. Preferably, a motor vehicle is not operated in coasting mode if a motor torque of the drive unit 1 of the motor vehicle is greater than a defined threshold value, and/or if a turbine torque of the automatic transmission 3 of the motor vehicle is greater than a defined limit. Thus, in coasting mode, an increased receiving torque of an oil pump does not lead directly to an increased consumption of the motor vehicle; rather, it leads to an increased rolling delay. A service brake may be disencumbered through the increased receiving torque of the oil pump.

A second, additional or alternative, condition, depending on which the interlocking of the shifting elements 6 of the automatic transmission 3 is permitted or not permitted or activated or deactivated, provides that the interlocking of the shifting elements is only permitted if the motor vehicle is not braked. The motor vehicle is preferably not braked if a service brake is not pressed on the driver's side, or if a driver assistance system, such as ACC system or an ESP system, is not braked, and/or the service brake is not triggered, and/or if the total of all wheel drive torques is greater than a threshold value.

According to a third, additional or alternative, condition, it is provided that the interlocking of the shifting elements 6 of the automatic transmission 3 of the motor vehicle is only permitted or activated if the motor vehicle is operated at a constant speed. Preferably, a constant speed is present if the speed of the motor vehicle is in a defined range for a defined period of time and/or the acceleration of the motor vehicle is in a defined range within a defined period of time. If a motor vehicle is operated at nearly constant speed, the execution or request of gearshifts is unlikely, such that an activation of the interlocking of the shifting elements 6 of an automatic transmission 3 is then sensible.

According to a fourth, additional or alternative, condition, it is provided that the interlocking of the shifting elements 6 of the automatic transmission 3 is only permitted or activated if the transmission oil temperature is neither too high nor too low. This condition is preferably fulfilled if, in particular, the transmission oil sump temperature is within a defined temperature range. This condition is based on the finding that, with low transmission oil temperatures, the filling of the shifting elements takes a relatively long time, such that a response to a request for a gearshift should not also be delayed by the interlocking of the shifting elements. With transmission temperatures that are too high, the leakage of the interlocking devices 7 may be high, such that an activation of the same is then not sensible.

According to a fifth, additional or alternative, condition, it is provided that the interlocking of the shifting elements is only permitted or activated if a driving program or shifting program permits the activation of the interlocking. For example, a driving program or shifting program of the transmission control device 5 may not permit the interlocking if a sports driving program or an off-road driving program or a manual shifting program is active, or if, for the motor vehicle, the automatic transmission of which is formed as a transfer gearbox or a range-change gearbox, a low drive position is engaged in one range group of the automatic transmission.

According to a sixth, additional or alternative, condition, it is provided that the interlocking of the shifting elements 6 of the automatic transmission 3 is permitted or activated if a sufficiently long period of time is available up to the next request for a gearshift. For this purpose, a time period that is available up to the execution of the next gearshift may be calculated by means of a shifting point prediction of a shifting program for the transmission control device 5. If this time frame is sufficiently great, i.e. greater than a threshold value, the activation of the interlocking of the shifting elements 6 of the automatic transmission 3 is permitted. Accordingly, in this case, a sufficiently long period of time is available, in which the consumption-enhancing effect of an interlocking of the shifting elements may be used.

According to a seventh, additional or alternative, condition, it is provided that the interlocking of the shifting elements 6 is to be permitted if the energy balance with an activated interlocking is positive. This condition is fulfilled if an energy amount required for the interlocking and subsequent unlocking of the interlocking devices 7, and thus the shifting elements 6, is smaller than an energy savings attainable between the interlocking and the unlocking of the same through the interlocking. This condition is based on the finding that the interlocking and subsequent unlocking of an interlocking device 7, and thus of a shifting element 6, takes place through a pressure increase. For this purpose, compared to the operation of the automatic transmission without interlocking, an additional energy amount is necessary; this is to be seen alongside such energy savings that arise when driving with an active interlocking of the shifting elements 6 and the reduced hydraulic pressure. A corresponding energy balancing then indicates whether the relevant energy balance is positive, and whether the interlocking of the shifting elements is worthwhile from an energy perspective.

According to an eighth, additional or alternative, condition, it is provided that the interlocking of the shifting elements 6 of a transmission 3 is only to be permitted or to be activated if there is a low amount of driver-side driving activity. This condition is preferably fulfilled if the pressing of the accelerator pedal on the driver's side and/or a temporal gradient of the pressing of the accelerator pedal on the driver's side is in a defined range, and/or if an indicator is not triggered on the driver's side.

If, on the driver's side, the accelerator pedal is pressed strongly, or pressed with high gradients, gearshifts within the range of the upper rotational speed limit should not be delayed, such that the activation of the interlocking of the shifting elements is then not permitted.

If a relatively large positive temporal gradient is then detected in the pressing of the accelerator pedal, requests for downshifts are likely.

If a relatively large negative temporal gradient of the pressing of the accelerator pedal is then present, a change to the brake and thus a downshift during deceleration is likely. In this case, the activation of the interlocking of the shifting elements is not sensible.

If an indicator is then triggered on the driver's side, this can be interpreted as a high amount of driving activity, since an overtaking maneuver or a turn-off maneuver is then likely. In this case as well, the activation of an interlocking of the shifting elements is not sensible.

A high amount of driver-side driving activity may also be inferred if the hands of a driver are located near a control device for the manual triggering of gearshifts. Through, for example, a near-field sensor system that is allocated, for example, in the area of paddle shifters mounted on a steering wheel, whether the hands of the driver are located near the paddle shifters may be detected. In this case, an imminent request for a gearshift is likely, such that, at that point, the activation of the interlocking of the shifting elements is not sensible and is not permitted.

According to a ninth, additional or alternative, condition, it is provided that an activation of the interlocking of the shifting elements is permitted only if a spontaneous driver-side performance request is unlikely. A spontaneous driver-side performance request is preferably determined on the basis of data of the route and/or on the basis of data of the driving situation, whereas a spontaneous driver-side performance request is particularly unlikely if a prohibition on overtaking is detected by a navigation system or a traffic sign recognition system for the route and/or if an overtaking maneuver is unlikely. In doing so, data regarding the weather may also be taken into account.

This ninth condition is based on the finding that a spontaneous acceleration request and thus a spontaneous driver-side performance request is unlikely if, based on route data stored in a navigation system and/or based on route data detected with the assistance of a traffic sign recognition system, a prohibition on overtaking is detected.

It is also possible to, based on a speed limit, infer that an overtaking maneuver is unlikely, particularly if the motor vehicle is driving at a speed that is within the range of the speed limit.

In addition, the oncoming traffic may be detected, in order to estimate the likelihood of an overtaking maneuver based on the oncoming traffic. The more oncoming traffic there is, the less likely there is an overtaking maneuver and thus a spontaneous performance request by the driver.

A spontaneous acceleration request and/or a spontaneous driver-side performance request is also unlikely if the weather data that is available indicates rain, snow or ice.

By contrast, a spontaneous driver-side power requirement is likely and an activation of the interlocking of the shifting elements is not to be permitted if route data (for example, the raising of the speed limit) makes an acceleration phase for the motor vehicle likely.

Likewise, an acceleration phase is also likely based on the route data particularly if a transition from a winding route to a straight route is detected.

In addition, a spontaneous performance request by the driver is likely if an overtaking maneuver is likely, which may be the case (for example), if the motor vehicle is driving behind a vehicle ahead of it, the speed of which is clearly less than a permitted maximum speed, and if there is also no detection of oncoming traffic, on the basis of which an overtaking maneuver is unlikely.

If, based on one or more of the above conditions, an activation of the interlocking of the shifting elements is not permitted or an interlocking of the shifting elements has been deactivated and/or terminated, it may be provided that a subsequent activation is to be permitted once again only after the expiration of a defined time frame, which may be referred to as a filter period or a debouncing period. This can be ensured by the fact that, through the activation of the interlocking of the shifting elements, shifting dynamics are not impermissibly limited.

For example, when there is so-called "gap-jumping," thus when there are successive overtaking maneuvers on country roads, a vehicle is continuously operated at a constant speed for a certain period of time, depending on the traffic situation and depending on the oncoming traffic, before the next overtaking maneuver is possible. In this case, sufficient shifting dynamics must be ensured through a deactivation or non-permission of the interlocking of the shifting elements.

As already stated, in one embodiment, it is provided that the activation of the interlocking of the shifting elements is not to be permitted if an overtaking maneuver is possible and likely.

The possibility of an overtaking maneuver may be detected, for example, by the fact that the route data is assessed, for example, through the number of lanes made available, oncoming traffic data, traffic flow data, data regarding the route ahead, such as for example regarding the topography of the route ahead, in order to infer the possibility of an overtaking maneuver. Acceleration reserves, speed limits and prohibitions on overtaking may also be taken into account, in order to decide whether an overtaking maneuver is possible or impossible, or likely or unlikely, as the case may be.

For the determination of the likelihood of an overtaking maneuver, data regarding the past driving habits of the driver and/or regarding the vehicles ahead of the vehicle and/or regarding the vehicles driving behind the vehicle and/or regarding weather conditions and/or regarding current driver activities, such as the triggering of an indicator, and/or regarding the current operating parameters of the vehicle are taken into account. The current operating parameters of the vehicle may be dependent, for example, on whether the vehicle is pulling a trailer and/or on the amount of the total weight of the vehicle as a consequence of the loading of the same.

The present invention also relates to a control device for implementing the method. This control device preferably comprises the transmission control device 5.

The control device includes tools for implementing the method in accordance with the invention. These tools comprise hardware and software tools.

The hardware tools comprise data interfaces, in order to exchange data with structural units for implementing the method in accordance with the invention. The hardware tools also comprise a processor and a memory, whereas the memory serves to store the data and the processor serves to process the data.

The software tools comprise program modules for implementing the method in accordance with the invention.

Modifications and variations can be made to the embodiments illustrated or described herein without departing from the scope and spirit of the invention as set forth in the appended claims.

The invention claimed is:

1. A method for operating an automatic transmission of a motor vehicle having a plurality of interlocking shifting elements, the method comprising:
   from data available from driving operation of the motor vehicle, determining (1) a change to consumption of the motor vehicle expected to result from an activated interlocking of shifting elements, and (2) a change to shifting dynamics of the motor vehicle expected to result from the activated interlocking of shifting elements; and
   permitting or not permitting interlocking of the shifting elements based on the determination of (1) and (2).

2. The method as in claim 1, wherein interlocking of the shifting elements is not permitted if the motor vehicle is in coasting mode, wherein the motor vehicle is not in coasting mode if motor torque of a drive unit in the motor vehicle or turbine torque of the automatic transmission are greater than a defined limit.

3. The method as in claim 1, wherein interlocking of the shifting elements is not permitted if the motor vehicle is braked, wherein the motor vehicle is braked if a driver's side service brake is pressed, a driver assistance brake system is engaged, or the total of all wheel drive torques is less than a threshold value.

4. The method as in claim 1, wherein interlocking of the shifting elements is permitted if the motor vehicle is operating at a constant speed, wherein the motor vehicle is at a constant speed if vehicle speed or acceleration are within a defined range over a defined period of time.

5. The method as in claim 1, wherein interlocking of the shifting elements is permitted if the transmission temperature is within a defined range as determined by transmission oil sump temperature.

6. The method as in claim 1, wherein interlocking of the shifting elements is permitted if a driving program or shifting program permits the interlocking of the shifting elements and neither a sports driving program, an off-road driving program, nor a manual shifting program is active.

7. The method as in claim 1, wherein interlocking of the shifting elements is permitted if a sufficiently long period of time is available before a subsequent gearshift request as determined by a shifting point prediction of the driving program.

8. The method as in claim 1, wherein interlocking of the shifting elements is permitted if an energy balance with an activated interlocking of the shifting elements is positive as compared to an energy amount needed for the interlocking and subsequent unlocking of the shifting elements.

9. The method as in claim 1, wherein interlocking of the shifting elements is permitted if there is an amount of detected driver-side driving activity below a defined level, the detected driver side activity including any one or combination of: pressing of an accelerator pedal, temporal gradient of pressing of the accelerator pedal within a defined range, or triggering of a driver's side indicator.

10. The method as in claim 1, wherein interlocking of the shifting elements is permitted if a spontaneous driver-side request is determined to be unlikely as determined by any one or combination of: data of the driving route, driving situation, information from a navigation system indicating that overtaking is prohibited, or recognition of a traffic sign that prohibits overtaking.

11. The method as in claim 1, wherein if the interlocking of the shifting elements is not permitted or is terminated, subsequent activation of the interlocking of the shifting elements is permissible after expiration of a defined time period.

12. A control system in the motor vehicle configured with a suitable configuration of hardware and software to implement the method set forth in claim 1.

\* \* \* \* \*